United States Patent
Rivera et al.

(10) Patent No.: US 10,592,726 B2
(45) Date of Patent: Mar. 17, 2020

(54) MANUFACTURING PART IDENTIFICATION USING COMPUTER VISION AND MACHINE LEARNING

(71) Applicant: Ford Motor Company, Dearborn, MI (US)

(72) Inventors: Alberto Rivera, Palo Alto, CA (US); Kiril Spasovski, Canton, MI (US); Shounak Athavale, San Jose, CA (US); Randy Nunez, San Jose, CA (US)

(73) Assignee: FORD MOTOR COMPANY, Dearborn, MI (US)

(*) Notice: Subject to any disclaimer, the term of this patent is extended or adjusted under 35 U.S.C. 154(b) by 60 days.

(21) Appl. No.: 15/891,982

(22) Filed: Feb. 8, 2018

(65) Prior Publication Data
US 2019/0244008 A1 Aug. 8, 2019

(51) Int. Cl.
| G06K 9/00 | (2006.01) |
| G06T 7/11 | (2017.01) |
| G06T 7/194 | (2017.01) |
| G06T 7/10 | (2017.01) |
| G06T 19/00 | (2011.01) |

(Continued)

(52) U.S. Cl.
CPC ............ *G06K 9/00201* (2013.01); *G06T 7/10* (2017.01); *G06T 7/11* (2017.01); *G06T 7/194* (2017.01); *G06T 19/006* (2013.01); *G06T 19/20* (2013.01); *G02B 27/017* (2013.01); *G06T 2207/10024* (2013.01); *G06T 2207/20081* (2013.01); *G06T 2207/20084* (2013.01); *G06T 2210/12* (2013.01)

(58) Field of Classification Search
CPC ........ G05D 1/0061; G05D 1/021; B60R 1/00; B60K 28/06; B60K 28/066; A61B 5/0205; A61B 5/01; A61B 5/11; G06K 9/00201; G06T 19/006
See application file for complete search history.

(56) References Cited

U.S. PATENT DOCUMENTS

| 7,171,897 B2 * | 2/2007 | Barajas ................ H05K 3/1233 |
| | | 101/123 |
| 8,078,552 B2 * | 12/2011 | Kaushal ............. G05B 13/0265 |
| | | 706/12 |

(Continued)

FOREIGN PATENT DOCUMENTS

WO   WO-2017121747   7/2017

OTHER PUBLICATIONS

Augmented Reality in Logistics.
Optimizing Warehouse Operations with Machine Learning on GPUs.

*Primary Examiner* — Amir Alavi
(74) *Attorney, Agent, or Firm* — David R. Stevens; Stevens Law Group (57) ABSTRACT

Systems, methods, and devices for object detection, including manufacturing part detection, are disclosed. A method for identifying a manufacturing part includes receiving an image comprising a manufacturing part from an augmented reality device and determining a bounding perimeter encapsulating the manufacturing part. The method includes receiving a prediction label and a confidence value for the manufacturing part from a neural network. The method includes generating a message comprising the image, the prediction label, and the confidence value, and providing the message to the augmented reality device.

20 Claims, 9 Drawing Sheets

(51) Int. Cl.
*G06T 19/20* (2011.01)
*G02B 27/01* (2006.01)

(56) References Cited

U.S. PATENT DOCUMENTS

| | | | | |
|---|---|---|---|---|
| 8,153,973 | B2* | 4/2012 | Williams | G01N 33/02 |
| | | | | 250/336.1 |
| 8,755,837 | B2* | 6/2014 | Rhoads | G06K 9/6253 |
| | | | | 455/556.1 |
| 9,811,754 | B2* | 11/2017 | Schwartz | G06K 9/00201 |
| 2010/0121480 | A1 | 5/2010 | Stelzer | |
| 2011/0145178 | A1* | 6/2011 | Schmidtler | G06N 20/00 |
| | | | | 706/12 |
| 2013/0010068 | A1 | 1/2013 | Tiernan | |
| 2013/0278635 | A1* | 10/2013 | Maggiore | G06T 19/006 |
| | | | | 345/633 |
| 2014/0083058 | A1 | 3/2014 | Issing | |
| 2016/0171122 | A1 | 6/2016 | Tonshal | |
| 2017/0098152 | A1 | 4/2017 | Kerr | |
| 2019/0164270 | A1* | 5/2019 | Wardell | G06T 7/001 |
| 2019/0244008 | A1* | 8/2019 | Rivera | G06K 9/00201 |

* cited by examiner

MANUFACTURING PART IDENTIFICATION USING COMPUTER VISION AND MACHINE LEARNING

TECHNICAL FIELD

The disclosure relates generally to systems, methods, and devices for recognizing and selecting an object, such as a manufacturing part, and providing information associated with the object.

BACKGROUND

Augmented reality aids serve to increase efficiency and accuracy in manufacturing and in selecting manufacturing parts. Certain "pick-by-vision" programs known in the art provide information about where a manufacturing part is located, or it may provide a diagram of a process for assembling manufacturing parts. Such programs include limitations including, for example, leading a person to select an incorrect part from an incorrect location, not providing detailed information for assembling parts, requiring that a part be labeled with a barcode or other unique identifier, or failing to provide accurate information to a user in real-time. Such limitations may lead a user to select incorrect parts or assemble parts incorrectly, and this may lead to serious losses in productivity in a manufacturing facility.

Many errors occur when selecting parts from storage bins and shelves. Common mistakes include selecting the wrong part, particularly when parts are very close in size or shape, and missing one or more parts. Such errors reduce efficiency and productivity and cause downtime in manufacturing, and such errors may cause a substantial cost for manufacturers. Some parts are very small or do not have a bar code or other unique identifier; these parts may only be identifiable by size, color, and other identifiers. Such parts may be difficult to distinguish by a human eye and are often mistaken during manufacturing production.

Systems, methods, and devices for identifying an object, such as a manufacturing part, increase manufacturing production, increase efficiency and accuracy in manufacturing, and reduce downtime. In certain manufacturing industries where complicated projects are completed using hundreds or thousands of unique parts, it is beneficial to utilize computer vision and machine learning for identifying manufacturing parts and ensuring projects are completed according to protocol.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Augmented reality aids increase efficiency and accuracy in the manufacturing industry. Such aids are used in various fields, including automotive manufacturing, where thousands or millions of manufacturing parts are located on-site, and a single project may require hundreds of unique parts. In many fields, including automotive manufacturing, a single project requires parts similar in size and shape that must not be mismatched during assembly. Such parts can be difficult for a human eye to differentiate. Augmented reality devices, including wearable augmented reality headsets or glasses, assist a user in selecting and recognizing correct manufacturing parts and assembling a complicated project requiring many unique parts. It should be appreciated that augmented reality systems as presently disclosed may be utilized in a plurality of scenarios, including any manufacturing and assembling industry.

In the present disclosure, Applicant proposes and presents systems, methods, and devices for object recognition through computer vision and machine learning. Such systems, methods, and devices may be integrated in an augmented reality device that may be utilized by a user tasked with selecting and assembling manufacturing parts. Such systems, methods, and devices may be integrated with a convolutional neural network (CNN) based on such CNN used for object detection and trained with a labeled training dataset.

Applicant proposes systems, methods, and devices for increasing efficiency and accuracy in selecting parts or objects. In an embodiment, a system provides a user with an indication of a location of a manufacturing part, including for example, an aisle number, a shelf number and/or location, and a bin number and/or location. The system recognizes the manufacturing part when the user approaches the correct location and the system indicates whether the user has selected the correct part. In an embodiment, the system includes the ability to record an image of the manufacturing part when the part is stocked and associated with a part number, a bar code, a QR code, or the like. The system is taught and learns each of a plurality of parts when the parts are stored in real-time. The system automatically receives and updates a picklist comprising a list of manufacturing parts necessary for completing a manufacturing project. The system includes the ability to read code labels, including bar codes, QR codes, and the like.

Before the methods, systems, and devices for detecting an object such as a manufacturing part are disclosed and described, it is to be understood that this disclosure is not limited to the configurations, process steps, and materials disclosed herein as such configurations, process steps, and materials may vary somewhat. It is also to be understood that the terminology employed herein is used for describing implementations only and is not intended to be limiting since the scope of the disclosure will be limited only by the appended claims and equivalents thereof.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

According to one embodiment of the disclosure, a method for identifying a manufacturing part is disclosed. In an embodiment, the method is performed by a computer server in communication with an augmented reality device and a neural network. The method includes receiving an image comprising a manufacturing part from an augmented reality device. The image may be extracted from a video stream received from the augmented reality device in real-time. The method includes determining a bounding perimeter encapsulating the manufacturing part and providing a sub-image created by the bounding perimeter to a neural network. The method includes receiving a prediction label and a confidence value for the manufacturing part from the neural network. The method includes generating a message comprising the image, the prediction label, and the confidence value, wherein the prediction label and the confidence value are overlaid on the original image received from the augmented reality device. The method includes providing the message to the augmented reality device. In an embodiment, the image, including the prediction label and the confidence value, is displayed to a user wearing the augmented reality device.

According to one embodiment, a system for identifying a manufacturing part is disclosed. The system includes an augmented reality device comprising a camera. The augmented reality device may include wearable devices such as a headset or pair of glasses that may be worn by a user. The system includes a server in communication with the augmented reality device comprising computer readable storage media storing instructions that, when executed by one or more processors cause the one or more processors to perform one or more method steps. The system includes a neural network in communication with the server, wherein the neural network is configured to determine a prediction label and a confidence value for a manufacturing part in an image captured by the augmented reality device. In an embodiment, the neural network comprises a CNN and is configured to learn and update in real-time new information relating to manufacturing parts, picklists, and manufacturing part storage locations.

According to one embodiment, a neural network comprises a CNN based on those used for object detection that is trained with a labeled training dataset of manufacturing part images that will function as a classifier. The convolutional layers apply a convolution operation to an input, such as an image of a manufacturing part, and pass the result to the next layer. The neural network is trained to identify and recognize various manufacturing parts with a threshold level of accuracy. The neural network is further trained to determine a confidence value for each object identification that is performed by the neural network.

Figure 1:
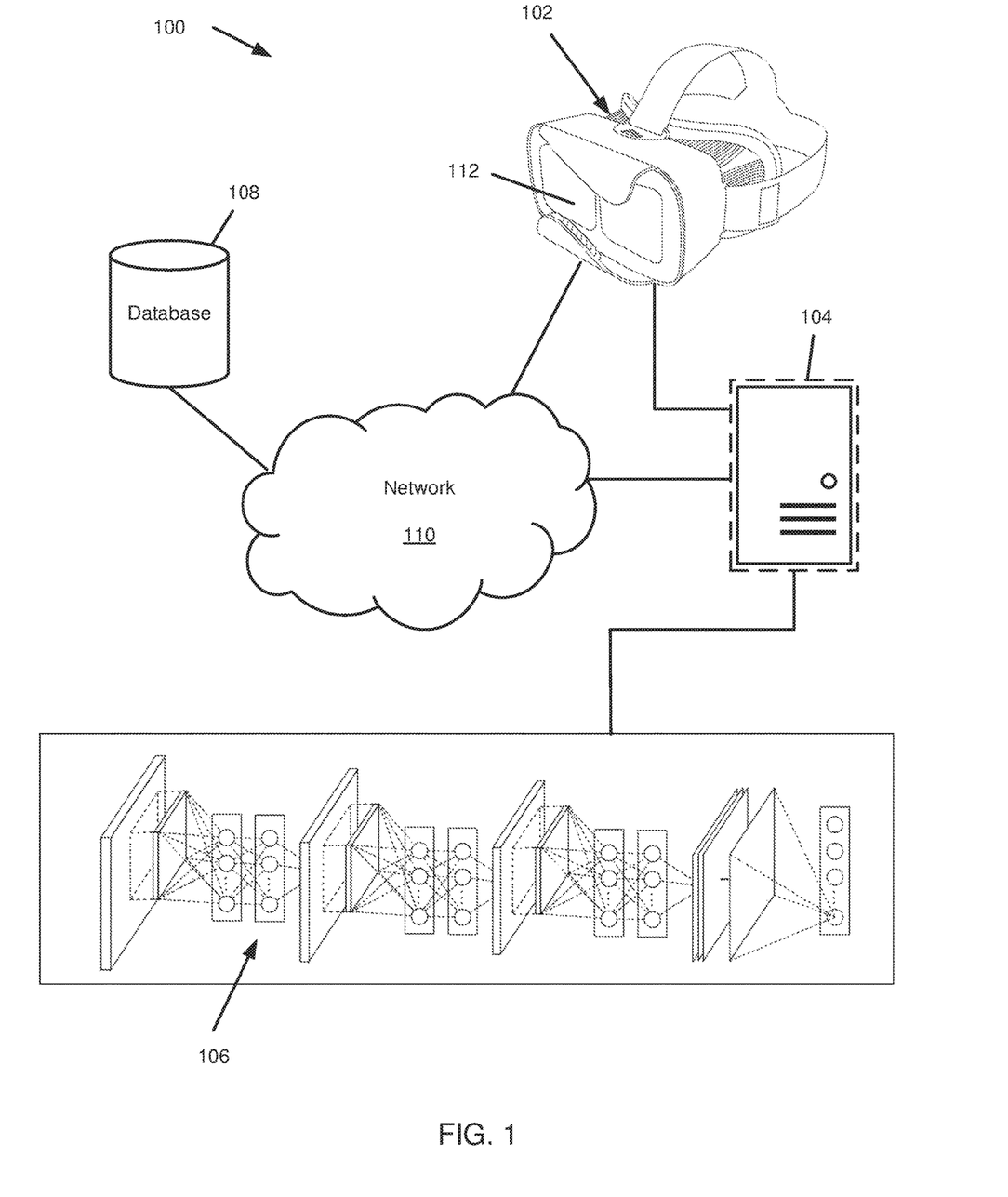
FIG. 1 is a schematic diagram illustrating a system for identifying a manufacturing part, according to one implementation.

Referring now to the figures, FIG. 1 illustrates an example system 100 that may be used for selecting and identifying parts, including manufacturing parts. The system 100 includes an augmented reality device 102 in communication with a network 110. The system 100 includes a server 104 in communication with the network 110 and a neural network 106. The network 110 may further be in communication with a database 108. It should be noted that the network 110 includes any suitable network known in the art, including a cloud computing network, and/or the Internet, and/or part of a closed or private network without departing from the scope of the disclosure.

The augmented reality device 102 includes any suitable augmented reality device 102 known in the art, including for example, augmented reality glasses, an augmented reality headset, and so forth. The augmented reality technology utilized by the augmented reality device 102 may include for example, projection-based augmented reality and superimposition-based augmented reality. The augmented reality device 102 includes one or more cameras capable of capturing images or video streams. It should be appreciated the one or more cameras may include depth sensing cameras and environment understanding cameras to aid in identifying and recognizing a manufacturing part. The one or more cameras may be utilized to view one or more manufacturing parts to provide an image or video stream of the manufacturing parts to the server 104. It should be appreciated the augmented reality device 102 may include one or more additional sensors that may aid in identifying and recognizing a manufacturing part. Such sensors include for example, LIDAR sensors, radar sensors, accelerometers, a global position system (GPS) sensor, and so forth.

The server 104 is in communication with the augmented reality device 102 and may send and receive information from the augmented reality device 102. The server 104 is further in communication with a neural network 106 such as a CNN, and may send and receive information from the neural network 106. The server 104 is responsible for one or more process steps in identifying a manufacturing part.

In an embodiment, a user is responsible for retrieving manufacturing parts from their storage location. The user is equipped with the augmented reality device 102 such as an augmented reality wearable headset. The augmented reality device 102 may be connected to the server 104 and may request a picklist. The server 104 may retrieve the appropriate picklist from a database 108 or in memory stored on the server 104. The server 104 provides the appropriate picklist to the augmented reality device 102. The picklist comprises necessary information to guide the user to retrieve the one or more necessary manufacturing parts. Such information may include part name, part number, part location, and so forth. The augmented reality device 102 provides the information to the user and guides the user to the correct location for a first part. The user may then approach the correct location and view the surroundings through the augmented reality device 102 to view the one or more parts stored at that location.

In an embodiment, the user may activate an object recognition component 112 of the augmented reality device 102. The object recognition component 112 may be activated by any means known in the art, including for example, via voice command, a hand gesture, or activating a button or so forth on the augmented reality device 102. The object recognition component 112 captures a video stream or image via the camera on the augmented reality device 102 and provides the video stream or image to the server 104. The server 104 receives the video stream or image. In an instance where the server 104 receives a video stream, the server 104 may extract an individual image from the video stream, wherein the individual image comprises a capture of one or more manufacturing parts.

In an embodiment, the server 104 receives and/or extracts an image comprising one or more manufacturing parts. The server 104 applies a color and magnitude of gradients threshold to the image to effectively remove a background of the image and leave only an outline of possible objects of interest within the image (e.g., the one or more manufacturing parts). The server 104 determines a contour of the manufacturing part to determine a mask that is representative of where the manufacturing part is located in the original image. The server 104 utilizes the contour to determine a bounding perimeter that encapsulates the entire contour of the manufacturing part. The bounding perimeter is applied to the original image and a sub-image is created by the bounding perimeter on the original image. The server 104 resizes the sub-image to fit into a machine learning model utilized by the neural network 106. The server 104 provides the sub-image to the neural network 106.

The neural network 106 receives the sub-image from the server 104 in one channel such that the image is grayscale. In an embodiment, the neural network 106 only receives images in one channel, rather than three channels (e.g., like a color image) to reduce the number of nodes in the neural network 106. Decreasing the number of nodes in the neural network 106 significantly increases processing time without providing a significant decrease in accuracy. The neural network 106 determines a prediction label comprising a prediction of an identity of the manufacturing part in the sub-image. The prediction label indicates, for example, a common name of a part, a specialized name of a part known to an industry, a part number, a descriptor of the part, a storage location of the part, and so forth. The neural network 106 determines a confidence value comprising a statistical likelihood that the prediction label is correct. In an embodiment, the confidence value represents a percentage likelihood that the prediction label is correct. The determination of the confidence value is based on one or more parameters, including for example, the quality of the image received by the neural network 106, the number of similar parts that the part in question may be mismatched with, a past performance by the neural network 106 in correctly identifying that prediction label, and so forth. The neural network 106 provides the prediction label and the confidence value to the server 104. The server 104 overlays the prediction label and the confidence value on the original image and provides the overlaid image to the augmented reality device 102. In an embodiment, the server 104 overlays the bounding perimeter around the manufacturing part, indicates the prediction label near the bounding perimeter, and indicates the confidence value near the bounding perimeter. In an embodiment where a single image comprises more than one manufacturing part, the server 104 may provide the bounding perimeter, the prediction label, and the confidence value in a different color for each manufacturing part.

In an embodiment, the neural network 106 is a convolutional neural network (CNN) as known in the art. The CNN comprises convolutional layers as the core building block of the neural network 106. A convolutional layer's parameters include a set of learnable filters or kernels, which have a small receptive field, but extend through the full depth of the input volume. During the forward pass, each filter is convolved across the width and height of the input volume, computing the dot product between the entries of the filter and the input and producing a two-dimensional activation map of the filter. As a result, the neural network 106 learns filters that activate when it detects a specific type of feature, such as a specific feature on a manufacturing part, at some spatial position in the input. In the neural network 106, stacking the activation maps for all filters along the depth dimension forms the full output volume of the convolution layer. Every entry in the output volume can thus also be interpreted as an output of a neuron that looks at a small region in the input and shares parameters with neurons in the same activation map. The neural network 106 as a CNN can successfully accomplish image recognition, including identifying a manufacturing part from an image captured by an augmented reality device 102, at a very low error rate.

Further by way of example with respect to the neural network 106, a single camera image (or other single set of sensor data) may be provided to common layers of the neural network 106, which act as a base portion of the neural network 106. The common layers perform feature extraction on the image and provide one or more output values that reflect the feature extraction. Because the common layers were trained for each of the tasks, the single feature extraction extract features needed by all of the tasks. The feature extraction values are output to the subtask portions including for example, first task layers, second task layers, and third task layers. Each of the first task layers, the second task layers, and the third task layers process the feature extraction values from the common layers to determine outputs for their respective tasks.

It is understood by one of skill in the art that a single neural network 106 is composed of a plurality of nodes and edges connecting the nodes. Weights or values for the edges or nodes is used to compute an output for an edge connecting to a subsequent node. A single neural network 106 may thus be composed of a plurality of neural networks to perform one or more tasks. The neural network 106 of FIG. 1 includes some common layers as a base portion or common portion of the neural network 106. The common layers may be understood as forming a sub network of the neural network 106. The computations and processing done in the common layers are then used by first task layers, second task layers, third task layers, and so forth. Thus, the neural network 106 includes a branching topology where the results of the common layers are then used independently by each of a plurality of subnetworks in branches of the neural network 106. Because the common layers were trained sequentially on a plurality of tasks to avoid forgetting previously trained tasks, the common layers may perform a task that serves each of the neural network branches well. Furthermore, the common layers result in reduced computing because the task of the common layers is performed once for all tasks represented by the branches, instead of once for each task. One example of the task to be performed by the common layers is feature extraction. However, any tasks that may have a shared initial processing task may share common layers.

Figure 2:
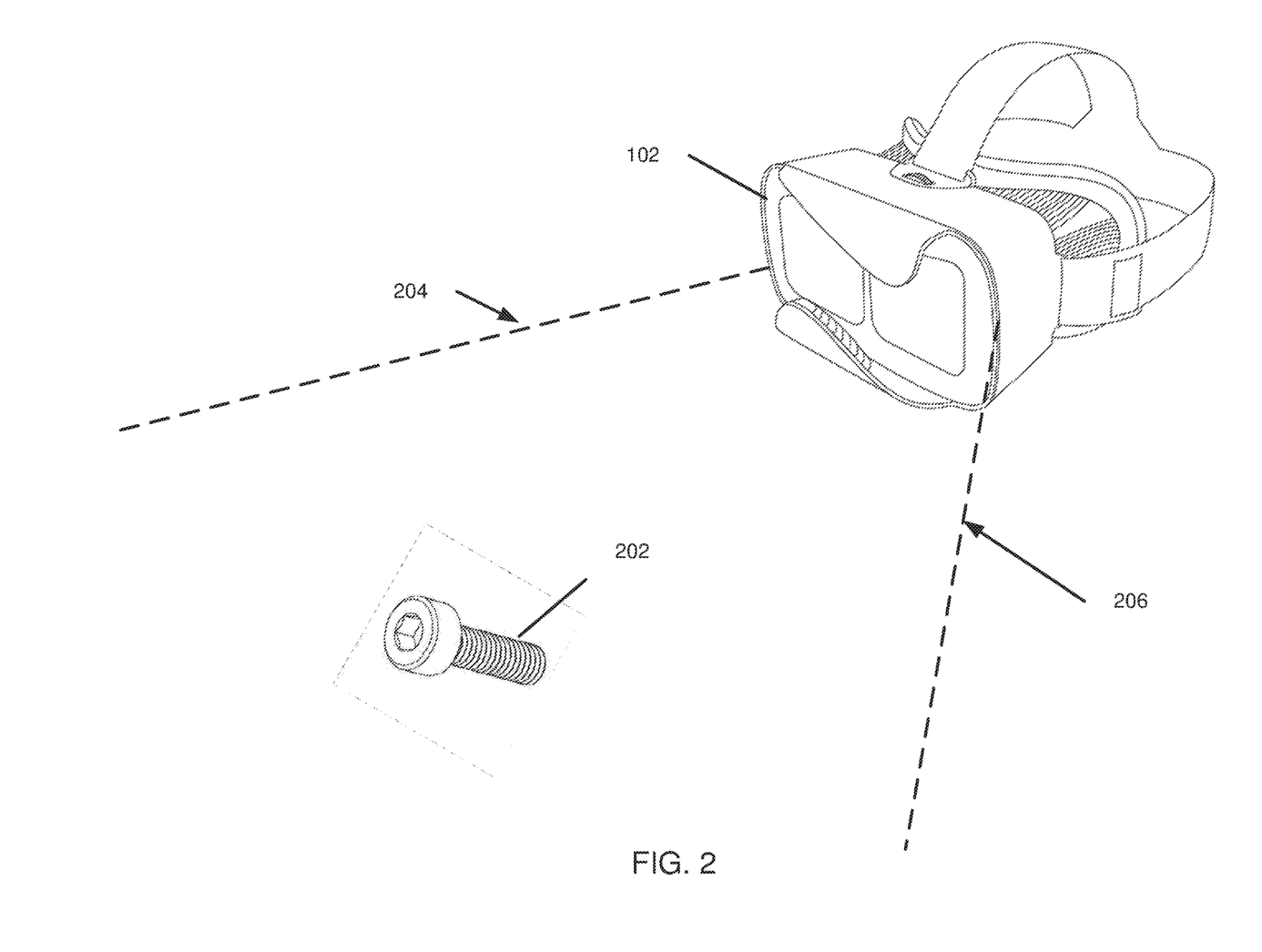
FIG. 2 illustrates a wearable augmented reality device detecting a manufacturing part, according to one implementation.

FIG. 2 illustrates an augmented reality device 102 viewing a manufacturing part 202 according to one implementation. The augmented reality device 102 has a field of vision marked by a first outer peripheral 204 and a second outer peripheral 206. A manufacturing part 202 within the field of vision may be detected by the augmented reality device 102. In an embodiment, the augmented reality device 102 captures a video stream as a user wears the augmented reality device 102, and the field of vision may reflect or approximate the user's actual field of vision when not wearing the augmented reality device 102.

Figure 3:
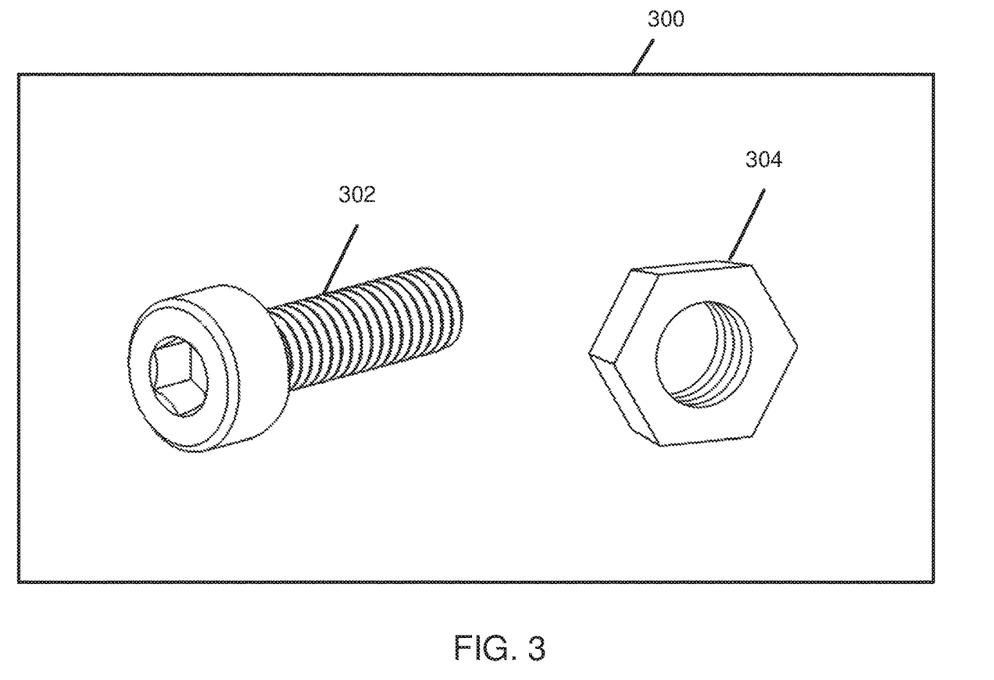
FIG. 3 illustrates an example image captured by an augmented reality device, according to one implementation.

FIGS. 3-7 illustrates various embodiments of images and sub-images as captured and determined by the systems, methods, and devices, disclosed herein. FIG. 3 illustrates an example original image 300 captured by an augmented reality device 102. The original image 300 comprises a first part 302 and a second part 304. The original image 300 may be captured as part of a video stream (comprising a plurality of image frames) by the augmented reality device 102 and extracted as an individual original image 300 by the server 104. The server 104 may receive the original image 300 from the augmented reality device 102.

Figure 4:
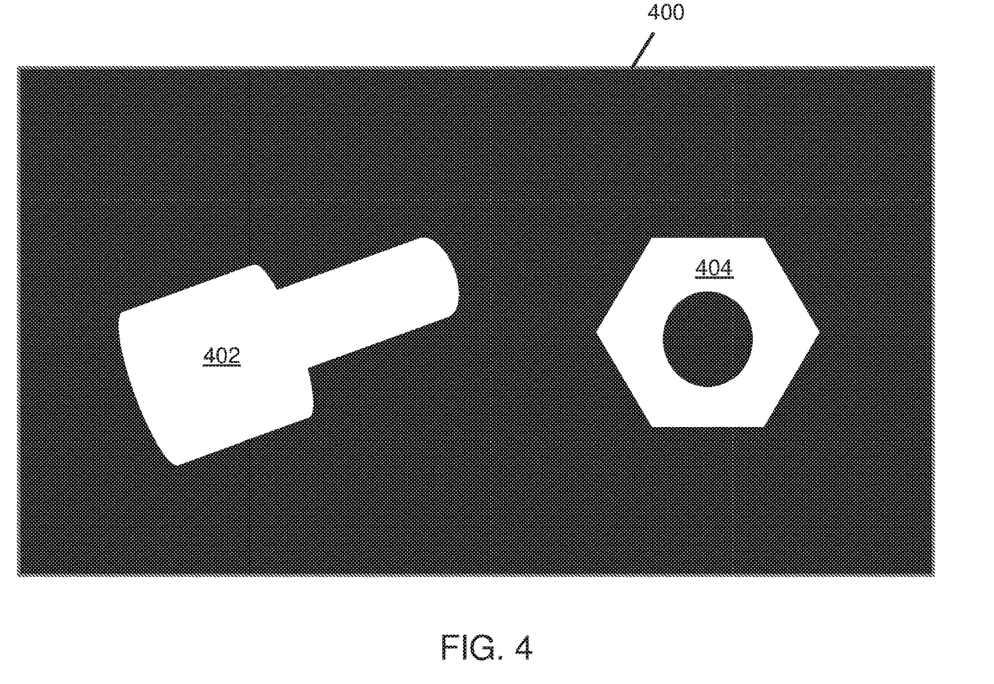
FIG. 4 illustrates an example image captured by an augmented reality device and altered by a server, according to one implementation.

FIG. 4 illustrates an altered original image 400 as determined by the server 104. The server 104 applies a color and magnitude of gradients threshold to the original image 300 to effectively remove the background of the original image 300 and leave only the outline of possible objects of interest. In an embodiment, the altered original image 400 includes a black background and one or more white contour shapes representing objects in the original image 300. In an embodiment, the altered original image 400 includes a first contour 402 representing a contour outline of the first part 302, and a second contour 404 representing a contour outline of the second part 304. The first contour 402 serves to determine a perimeter or outline that encapsulates that entire body of the first part 302. The second contour 404 similarly serves to determine a perimeter or outline that encapsulates the entire body of the second part 304.

Figure 5:
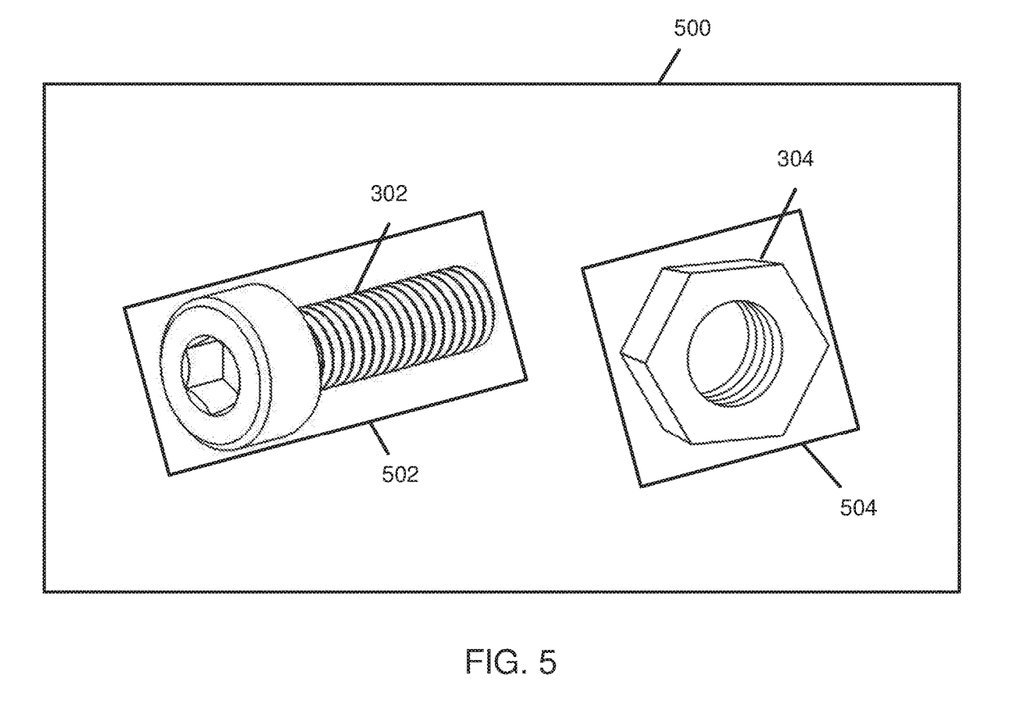
FIG. 5 illustrates an example image captured by an augmented reality device and altered by a server, according to one implementation.

FIG. 5 illustrates a bounding perimeter image 500, including the original image 300 with bounding perimeters 502, 504 applied to the one or more objects in the original image 300. The bounding perimeter image 500 includes a first bounding perimeter 502 encapsulating the first part 302, and a second bounding perimeter 504 encapsulating the second part 304. In an embodiment, the server 104 applies a first bounding perimeter 502, 504 to a part 302, 304 after determining the contour 402, 404 of the part. The bounding perimeter 502, 504 serves to closely encapsulate an entire body of the part as determined by the contour as shown in FIG. 4.

Figure 6:
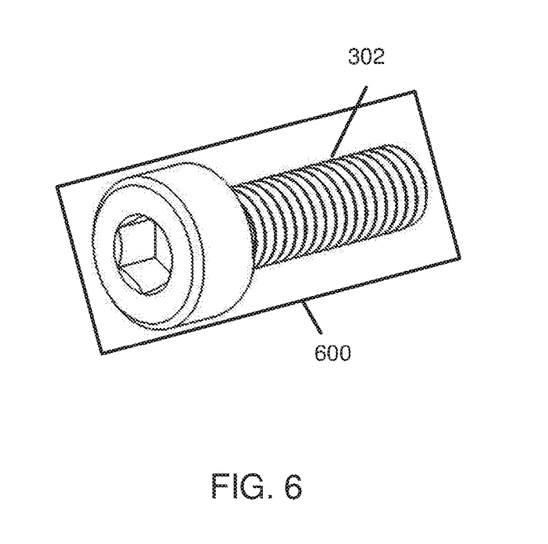
FIG. 6 illustrates an example sub-image as prepared by a server for processing by a neural network, according to one implementation.

FIG. 6 illustrates a first sub-image 600 including the first part 302 as created and determined by the size and shape of the first bounding perimeter 502. The server 104 determines the first sub-image 600 and provides the first sub-image 600 to the neural network 106. The first sub-image 600 includes the entirety of the original image 300 located within the confines of the first bounding perimeter 502.

Figure 7:
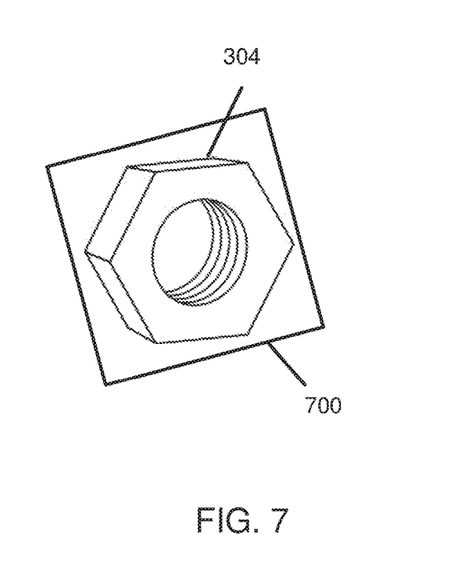
FIG. 7 illustrates an example sub-image as prepared by a server for processing by a neural network, according to one implementation.

FIG. 7 illustrates a second sub-image 700 of the second part 304 as created and determined by the size and shape of the second bounding perimeter 504. The server 104 determines the second sub-image 700 and provides the second sub-image 700 to the neural network 106. The second sub-image 700 includes the entirety of the original image 300 located within the confines of the second bounding perimeter 504.

Figure 8:
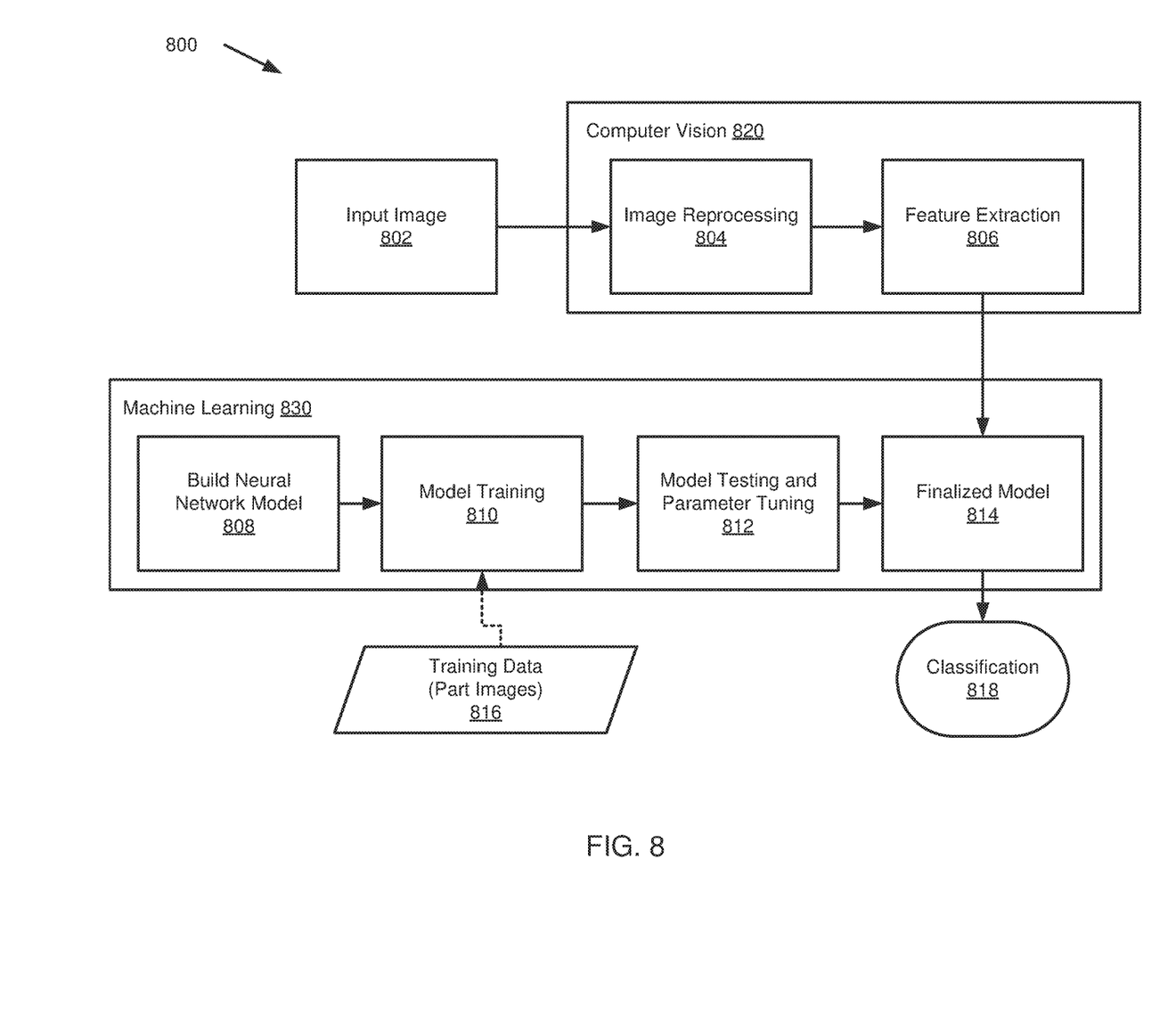
FIG. 8 is a schematic flow chart diagram of an example process flow for object detection and identification, according to one implementation.

FIG. 8 illustrates a schematic block diagram of a process flow 800 for object detection and identification. The process flow 800 is performed in part by computer vision 820 and machine learning 830. The computer vision 820 receives an input image 802, such as an original image 300 captured by an augmented reality device 102. The computer vision 820 conducts image reprocessing at 804 and feature extraction at 806. In an embodiment, the computer vision 820 processes are performed by a server 104. Image reprocessing 804 and feature extractions 806 includes such reprocessing and extraction as illustrated in FIGS. 3-7.

Machine learning 830 is responsible for building a neural network model at 808, training the neural network model at 810, testing the neural network model and tuning parameters in the neural network model at 812, and finalizing the neural network model at 814. Machine learning 830 may receive training data at 816, including for example images of manufacturing parts, to assist in training the neural network model 808. In an embodiment, the machine learning 830 is performed by a neural network 106 such as a CNN.

Computer vision 820 provides an image to the finalized model at 814 for the image to be classified at 818 by machine learning 830. In an embodiment the neural network 106 comprises the finalized model 814 of the machine learning 830 process flow. The finalized model 814 may be in communication with the server 104 and therefore the augmented reality device 102 after the finalized model 814 has been formed by machine learning 830.

Figure 9:
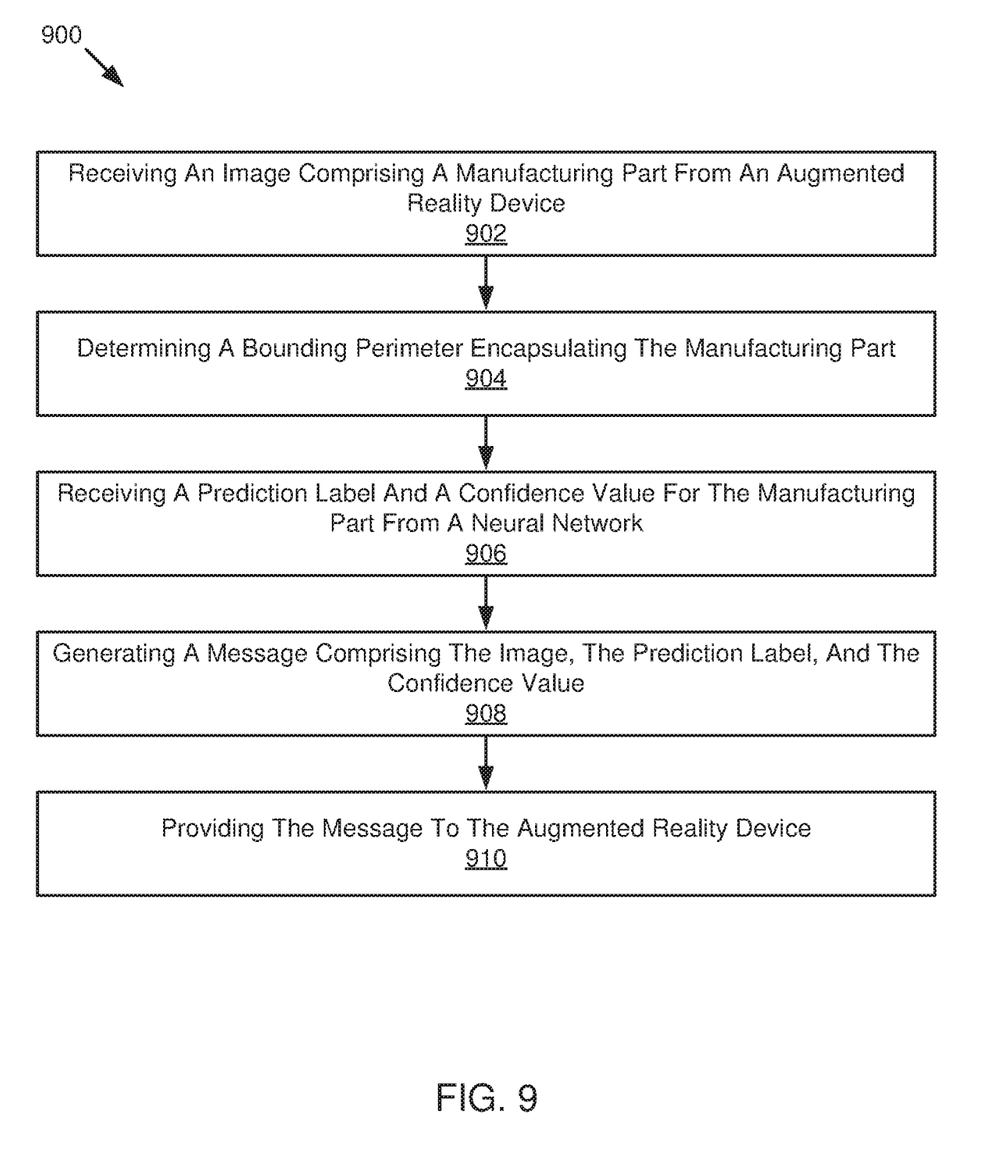
FIG. 9 is a schematic flow chart diagram illustrating a method for identifying a manufacturing part, according to one implementation.

FIG. 9 illustrates a schematic flow chart diagram of a method 900 of identifying a manufacturing part. The method 900 begins and the server 104 receives an image comprising a manufacturing part from an augmented reality device at 902. The server 104 determines a bounding perimeter encapsulating the manufacturing part at 904. The server 104 receives a prediction label and a confidence value for the manufacturing part from a neural network at 906. The server 104 generates a message comprising the image, the prediction label, and the confidence value at 908. The server 104 provides the message to the augmented reality device at 910.

Figure 10:
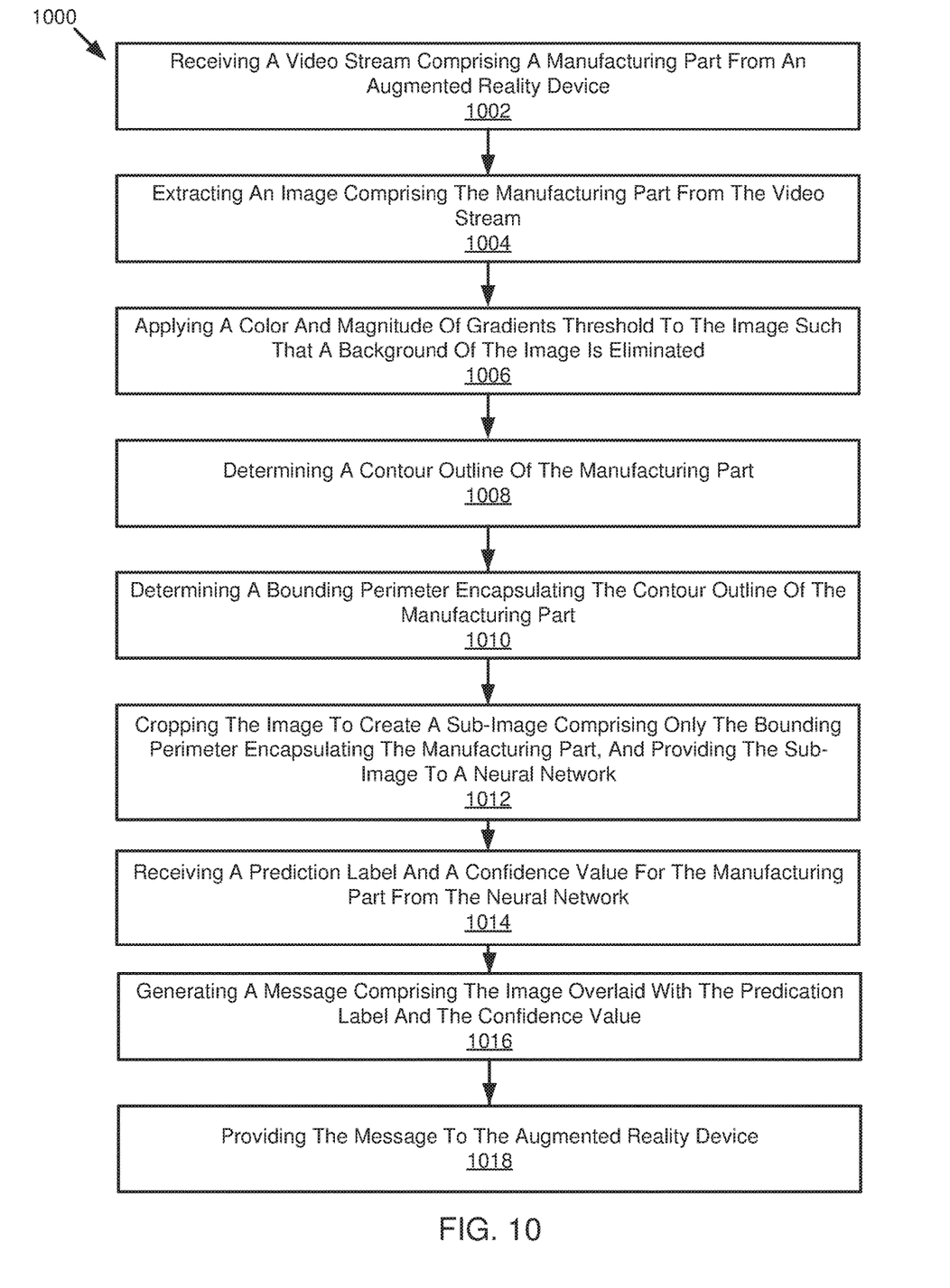
FIG. 10 is a schematic flow chart diagram illustrating a method for identifying a manufacturing part, according to one implementation.

FIG. 10 illustrates a schematic flow chart diagram of a method 1000 of identifying a manufacturing part. The method 1000 begins and the server 104 receives a video stream comprising a manufacturing part from an augmented reality device at 1002. The server 104 extracts an image comprising the manufacturing part from the video stream at 1004. The server 104 applies a color and magnitude of gradients threshold to the image such that a background of the image is eliminated at 1006. The server 104 determines a contour outline of the manufacturing part at 1008. The server 104 determines a bounding perimeter encapsulating the contour outline of the manufacturing part at 1010. The server 104 crops the image to create a sub-image comprising only the bounding perimeter encapsulating the manufacturing part, and provides the sub-image to a neural network at 1012. The server 104 receives a prediction label and a confidence value for the manufacturing part from the neural network at 1014. The server 1016 creates or generates a message comprising the image overlaid with the prediction label and the confidence value at 1016. The server 104 provides the message to the augmented reality device at 1018.

Figure 11:
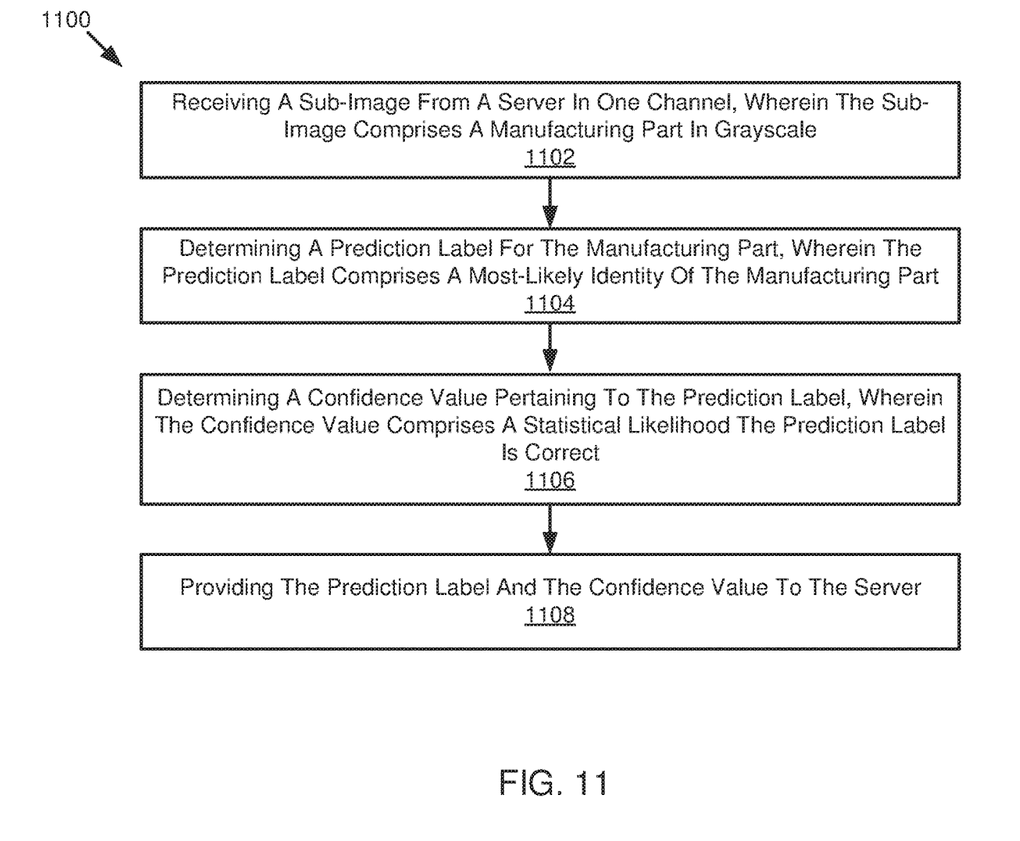
FIG. 11 is a schematic flow chart diagram illustrating a method for identifying a manufacturing part, according to one implementation.

FIG. 11 illustrates a schematic flow chart diagram of a method 1100 of identifying a manufacturing part. The method 1100 begins and a neural network 106 receives a sub-image from a server 104 in one channel, wherein the sub-image comprises a manufacturing part in grayscale at 1102. The neural network 106 determines a prediction label for the manufacturing part, wherein the prediction label comprises a most likely identity of the manufacturing part at 1104. The neural network 106 determines a confidence value pertaining to the prediction label, wherein the confidence value comprises a statistical likelihood the prediction label is correct at 1106. The neural network 106 provides the prediction label and the confidence value to the server at 1108.

Figure 12:
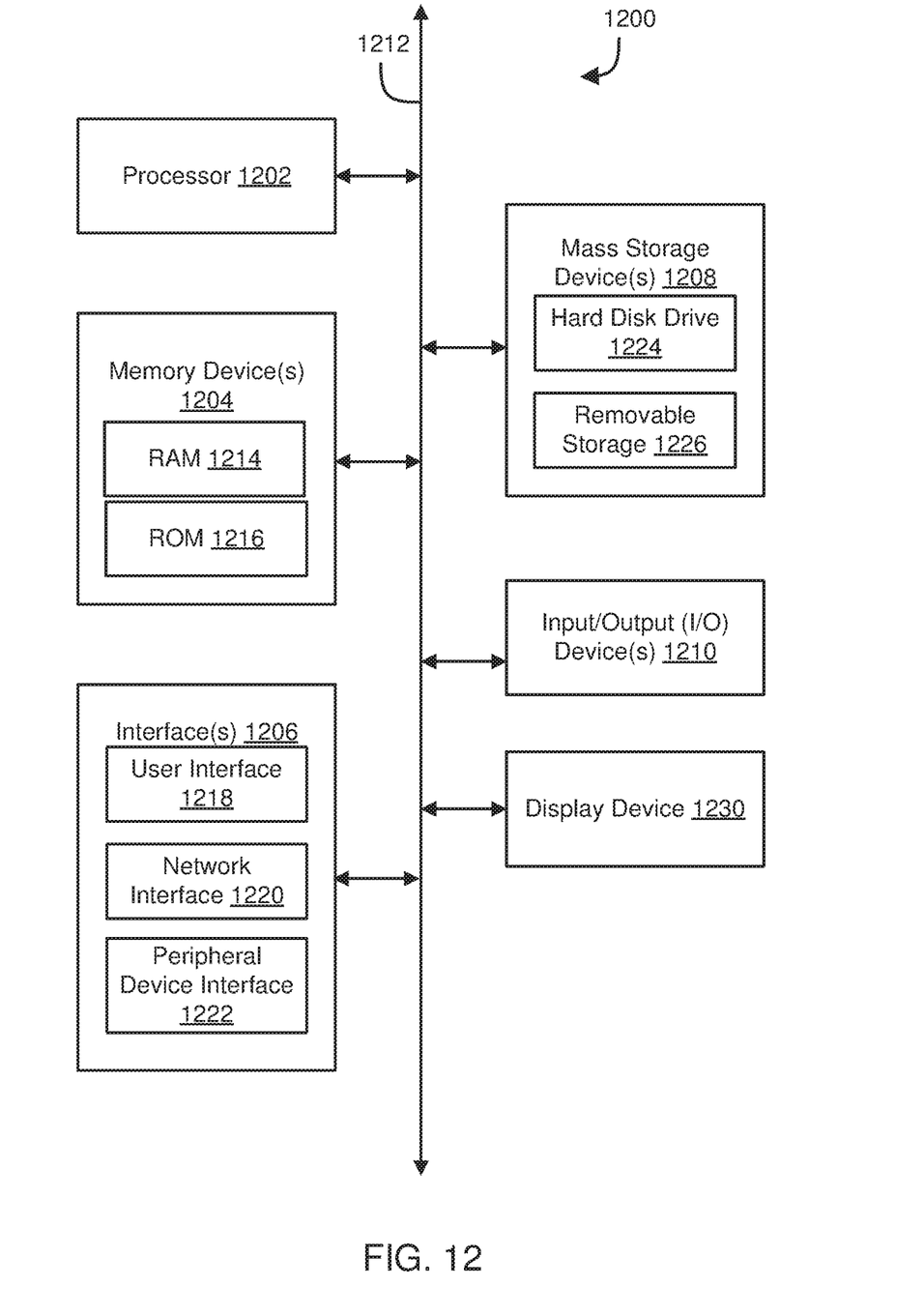
FIG. 12 is a schematic block diagram illustrating an example computing system, according to one implementation.

Referring now to FIG. 12, a block diagram of an example computing device 1200 is illustrated. Computing device 1200 may be used to perform various procedures, such as those discussed herein. In one embodiment, the computing device 1200 can function as an augmented reality device 102, a server 104, a neural network 106, and the like. Computing device 1200 can perform various monitoring functions as discussed herein, and can execute one or more application programs, such as the application programs or functionality described herein. Computing device 1200 can be any of a wide variety of computing devices, such as a desktop computer, in-dash computer, vehicle control system, a notebook computer, a server computer, a handheld computer, tablet computer and the like.

Computing device 1200 includes one or more processor(s) 1202, one or more memory device(s) 1204, one or more interface(s) 1206, one or more mass storage device(s) 1208, one or more Input/Output (I/O) device(s) 1210, and a display device 1230 all of which are coupled to a bus 1212. Processor(s) 1202 include one or more processors or controllers that execute instructions stored in memory device(s) 1204 and/or mass storage device(s) 1208. Processor(s) 1202 may also include various types of computer-readable media, such as cache memory.

Memory device(s) 1204 include various computer-readable media, such as volatile memory (e.g., random access memory (RAM) 1214) and/or nonvolatile memory (e.g., read-only memory (ROM) 1216). Memory device(s) 1204 may also include rewritable ROM, such as Flash memory.

Mass storage device(s) 1208 include various computer readable media, such as magnetic tapes, magnetic disks, optical disks, solid-state memory (e.g., Flash memory), and so forth. As shown in FIG. 12, a particular mass storage device is a hard disk drive 1224. Various drives may also be included in mass storage device(s) 1208 to enable reading from and/or writing to the various computer readable media. Mass storage device(s) 1208 include removable media 1226 and/or non-removable media.

I/O device(s) 1210 include various devices that allow data and/or other information to be input to or retrieved from computing device 1200. Example I/O device(s) 1210 include cursor control devices, keyboards, keypads, microphones, monitors or other display devices, speakers, printers, network interface cards, modems, and the like.

Display device 1230 includes any type of device capable of displaying information to one or more users of computing device 1200. Examples of display device 1230 include a monitor, display terminal, video projection device, and the like.

Interface(s) 1206 include various interfaces that allow computing device 1200 to interact with other systems, devices, or computing environments. Example interface(s) 1206 may include any number of different network interfaces 1220, such as interfaces to local area networks (LANs), wide area networks (WANs), wireless networks, and the Internet. Other interface(s) include user interface 1218 and peripheral device interface 1222. The interface(s) 1206 may also include one or more user interface elements 1218. The interface(s) 1206 may also include one or more peripheral interfaces such as interfaces for printers, pointing devices (mice, track pad, or any suitable user interface now known to those of ordinary skill in the field, or later discovered), keyboards, and the like.

Bus 1212 allows processor(s) 1202, memory device(s) 1204, interface(s) 1206, mass storage device(s) 1208, and I/O device(s) 1210 to communicate with one another, as well as other devices or components coupled to bus 1212. Bus 1212 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 1200, and are executed by processor(s) 1202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments.

Example 1 is a method for identifying a manufacturing part. The method includes receiving an image comprising a manufacturing part from an augmented reality device and determining a bounding perimeter encapsulating the manufacturing part. The method includes receiving a prediction label and a confidence value for the manufacturing part from a neural network. The method includes generating a message comprising the image, the prediction label, and the confidence value and providing the message to the augmented reality device.

Example 2 is a method as in Example 1, further comprising applying a color and magnitude of gradients threshold to the image such that a background of the image is mostly eliminated, and a contour of the manufacturing part is remaining.

Example 3 is a method as in Example 2, further comprising determining a contour outline of the manufacturing part based on the remaining contour of the manufacturing part.

Example 4 is a method as in any of Example 1-3, wherein the augmented reality device comprises a camera and a display having augmented reality capabilities, and wherein the augmented reality device is configured to be worn by a user.

Example 5 is a method as in any of Example 1-4, wherein receiving the image comprises receiving a video stream from the augmented reality device, and wherein the method further comprises extracting the image as a single frame from the video stream.

Example 6 is a method as in any of Example 1-5, further comprising extracting a sub-image comprising image data within confines of the bounding perimeter and resizing the sub-image to create a resized sub-image to be processed by the neural network.

Example 7 is a method as in Example 6, wherein the neural network receives the sub-image from the server in one-channel as a grayscale image.

Example 8 is a method as in any of Example 1-7, further comprising providing a manufacturing part picklist to the augmented reality device, wherein the manufacturing part picklist comprises data to guide a user operating the augmented reality device to retrieve one or more manufacturing parts.

Example 9 is a method as in any of Example 1-8, wherein the neural network comprises a convolutional neural network trained for object detection.

Example 10 is a method as in any of Example 1-9, wherein generating the message comprises overlaying the prediction label and the confidence value on the image such that the prediction label and the confidence value are located near or overlaid on top of the manufacturing part.

Example 11 is a manufacturing part identification system. The system includes an augmented reality device comprising a camera. The system includes a server in communication with the augmented reality device comprising computer readable storage media storing instructions that, when executed by one or more processors cause the one or more processors to: receive an image comprising a manufacturing part from the augmented reality device; determine a contour of the manufacturing part based on the image; and determine a bounding perimeter encapsulating the manufacturing part. The system includes a neural network in communication with the server, wherein the neural network is configured to: determine a prediction label for the manufacturing part; and determine a confidence value comprising a statistical likelihood that the prediction label is correct.

Example 12 is a system as in Example 11, wherein the augmented reality device comprises a camera and a display having augmented reality capabilities, and wherein the augmented reality device is configured to be worn by a user.

Example 13 is a system as in any of Example 11-12, wherein the server comprising computer readable storage media further causes the one or more processors to determine a sub-image, wherein the sub-image comprises the image cropped to the bounding perimeter encapsulating the manufacturing part.

Example 14 is a system as in any of Example 11-13, wherein the server comprising computer readable storage media further causes the one or more processors to resize the sub-image to a shape and/or resolution accepted by the neural network.

Example 15 is a system as in any of Example 11-14, wherein the neural network is further configured to receive the sub-image from the server in one-channel as a grayscale image.

Example 16 is a system as in any of Example 11-15, wherein the server comprising computer readable storage media further causes the one or more processors to apply a color and magnitude of gradients threshold to the image such that a background of the image is mostly eliminated, and a contour of the manufacturing part remains.

Example 17 is a system as in any of Example 11-16, wherein the neural network comprises a convolution neural network trained for object detection.

Example 18 is a system as in any of Example 11-17, wherein the augmented reality device is configured to provide a video stream to the server in real-time for detection of manufacturing parts in real-time.

Example 19 is a system as in any of Example 11-18, wherein the server comprising computer readable storage media further causes the one or more processors to overlay the prediction label and the confidence value on the image, and provide the image to the augmented reality device.

Example 20 is a system as in any of Example 11-19, wherein the server comprising computer readable storage media further causes the one or more processors to provide a manufacturing part picklist to the augmented reality device, wherein the manufacturing part picklist comprises data to guide a user operating the augmented reality device to retrieve and select one or more manufacturing parts.

Example 21 is computer readable storage media storing instructions that, when executed by one or more processors, cause the one or more processors to: receive an image comprising a manufacturing part from an augmented reality device; apply a color and magnitude of gradients threshold to the image such that a background of the image is effectively eliminated; determine a contour outline of the manufacturing part; determine a bounding perimeter encapsulating the contour outline; receive a prediction label and a confidence value for the manufacturing part from a convolution deep neural network; generate a message comprising the image, the prediction label, and the confidence value; and provide the message to the augmented reality device.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium, which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. The terms "modules" and "components" are used in the names of certain components to reflect their implementation independence in software, hardware, circuitry, sensors, or the like. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

The invention claimed is:

1. A method for identifying a manufacturing part, the method comprising:
   receiving an image comprising a manufacturing part from an augmented reality device;
   determining a bounding perimeter encapsulating the manufacturing part;
   receiving a prediction label and a confidence value for the manufacturing part from a neural network;
   generating a message comprising the image, the prediction label, and the confidence value; and
   providing the message to the augmented reality device.

2. The method of claim 1, further comprising applying a color and magnitude of gradients threshold to the image such that a background of the image is mostly eliminated, and a contour of the manufacturing part is remaining.

3. The method of claim 2, further comprising determining a contour outline of the manufacturing part based on the remaining contour of the manufacturing part.

4. The method of claim 1, wherein the augmented reality device comprises a camera and a display having augmented reality capabilities, and wherein the augmented reality device is configured to be worn by a user.

5. The method of claim 1, wherein receiving the image comprises receiving a video stream from the augmented reality device, and wherein the method further comprises extracting the image as a single frame from the video stream.

6. The method of claim 1, further comprising extracting a sub-image comprising image data within confines of the bounding perimeter and resizing the sub-image to create a resized sub-image to be processed by the neural network.

7. The method of claim 1, further comprising providing a manufacturing part picklist to the augmented reality device, wherein the manufacturing part picklist comprises data to guide a user operating the augmented reality device to retrieve one or more manufacturing parts.

8. The method of claim 1, wherein the neural network comprises a convolutional neural network trained for object detection.

9. The method of claim 1, wherein generating the message comprises overlaying the prediction label and the confidence value on the image such that the prediction label and the confidence value are located near or overlaid on top of the manufacturing part in the image.

10. A manufacturing part identification system comprising:
an augmented reality device comprising a camera;
a server in communication with the augmented reality device comprising computer readable storage media storing instructions that, when executed by one or more processors cause the one or more processors to:
receive an image comprising a manufacturing part from the augmented reality device;
determine a contour outline of the manufacturing part based on the image; and
determine a bounding perimeter encapsulating the manufacturing part; and
a neural network in communication with the server, wherein the neural network is configured to:
determine a prediction label for the manufacturing part; and
determine a confidence value comprising a statistical likelihood that the prediction label is correct.

11. The system of claim 10, wherein the augmented reality device comprises a camera and a display having augmented reality capabilities, and wherein the augmented reality device is configured to be worn by a user.

12. The system of claim 10, wherein the server comprising computer readable storage media further causes the one or more processors to determine a sub-image, wherein the sub-image comprises the image cropped to the bounding perimeter encapsulating the manufacturing part.

13. The system of claim 12, wherein the server comprising computer readable storage media further causes the one or more processors to resize the sub-image to a shape and/or resolution accepted by the neural network.

14. The system of claim 13, wherein the neural network is further configured to receive the sub-image from the server in one channel as a grayscale image.

15. The system of claim 10, wherein the server comprising computer readable storage media further causes the one or more processors to apply a color and magnitude of gradients threshold to the image such that a background of the image is mostly eliminated, and a contour of the manufacturing part remains.

16. The system of claim 10, wherein the neural network comprises a convolution neural network trained for object detection.

17. The system of claim 10, wherein the augmented reality device is configured to provide a video stream to the server in real-time for detection of manufacturing parts in real-time.

18. The system of claim 10, wherein the server comprising computer readable storage media further causes the one or more processors to overlay the prediction label and the confidence value on the image, and provide the image to the augmented reality device.

19. The system of claim 10, wherein the server comprising computer readable storage media further causes the one or more processors to provide a manufacturing part picklist to the augmented reality device, wherein the manufacturing part picklist comprises data to guide a user operating the augmented reality device to retrieve and select one or more manufacturing parts.

20. Non-transitory computer readable storage media storing instructions that, when executed by one or more processors, cause the one or more processors to:
receive an image comprising a manufacturing part from an augmented reality device;
apply a color and magnitude of gradients threshold to the image such that a background of the image is mostly eliminated, and a contour of the manufacturing part remains;
determine a contour outline of the manufacturing part;
determine a bounding perimeter encapsulating the contour outline;
receive a prediction label and a confidence value for the manufacturing part from a convolutional deep neural network;
generate a message comprising the image, the prediction label, and the confidence value; and
provide the message to the augmented reality device.

* * * * *